June 16, 1925.

W. A. MERRICK

THERMOSTAT CONTROL FOR WATER HEATERS

Filed March 10, 1924   2 Sheets-Sheet 1

1,542,712

INVENTOR.
William Alford Merrick
BY Westall and Wallace
ATTORNEYS

June 16, 1925.
W. A. MERRICK
THERMOSTAT CONTROL FOR WATER HEATERS
Filed March 10, 1924    2 Sheets-Sheet 2
1,542,712
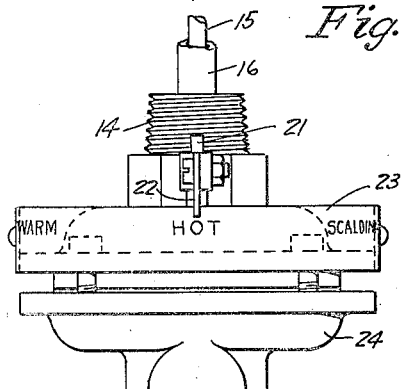
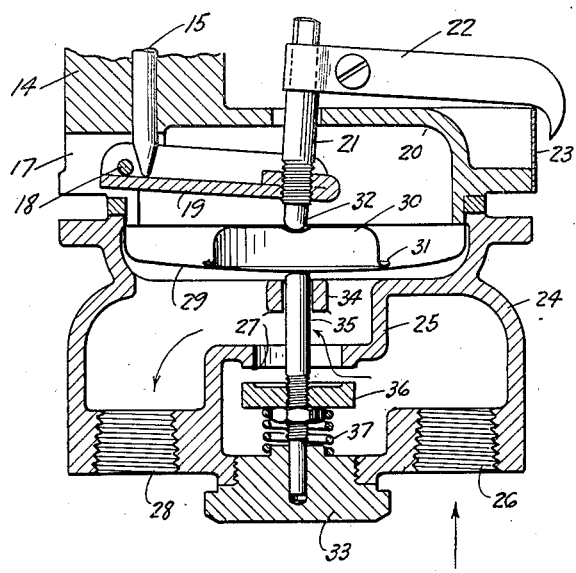
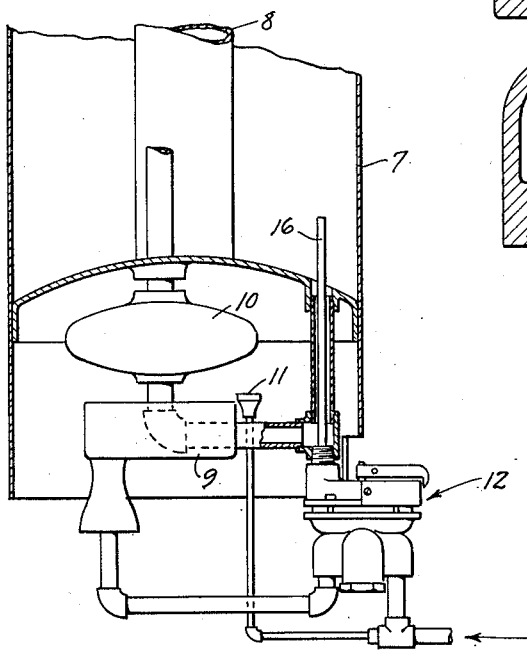
INVENTOR.
William Alford Merrick
BY Westall and Wallace
ATTORNEYS Patented June 16, 1925.

1,542,712

UNITED STATES PATENT OFFICE.

WILLIAM ALFORD MERRICK, OF LOS ANGELES, CALIFORNIA.

THERMOSTAT CONTROL FOR WATER HEATERS.

Application filed March 10, 1924. Serial No. 698,049.

*To all whom it may concern:*

Be it known that I, WILLIAM ALFORD MERRICK, a citizen of the United States, and resident of Los Angeles, in the county of Los Angeles, State of California, have invented new and useful Improvements in a Thermostat Control for Water Heaters, of which the following is a specification.

This invention relates to a snap-over mechanism actuated by a movable member having a small degree of motion. The present invention is especially applicable to temperature control devices. There is at present a class of water heaters comprising a tank, a gaseous fuel burner, and a thermostatically actuated valve mechanism wherein the heat of the water in the tank controls the flow of gas to the burners. In such heaters, it is desirable to have the fuel valve quickly open and close. To accomplish this a snap-over mechanism is interposed between the fuel valve and a thermostatically expansible medium, whereby upon the medium having reached a selected degree of expansion or contraction determined by the temperature of the water desired, the snap-over mechanism is actuated to completely open the fuel valve or vice versa. It is also desirable to have a device operable by the user of the tank to adjust the temperature.

The primary object of this invention is to provide a snap-over mechanism of the spring diaphragm type having few parts so arranged as to have a minimum of strain placed thereon, which is economical to manufacture, durable, positive in operation, and will not easily get out of order. Another object of this invention is to provide a thermostat control having a valve which normally has a tendency to close and wherein the thermally expansible medium acts through connecting mechanism to maintain the valve open against the tendency to close. Thus, when the thermostatic actuating mechanism breaks, the valve will be closed. A further object of this invention is to provide a temperature regulator operable by the user whereby to adjust the mechanism to maintain a selected temperature in the tank.

Figure 1:
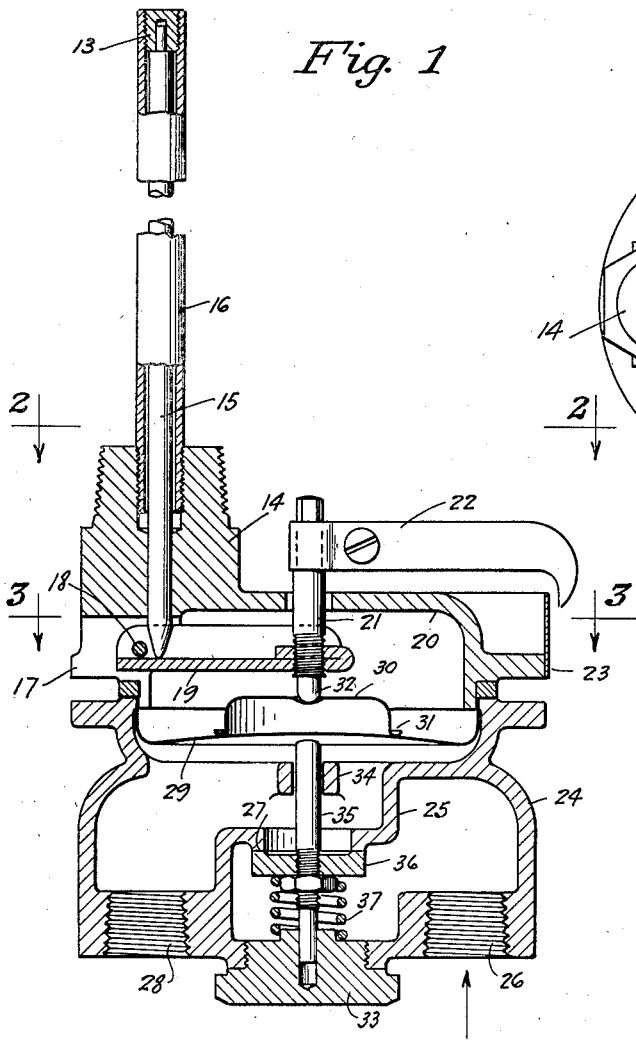
Figure 2:
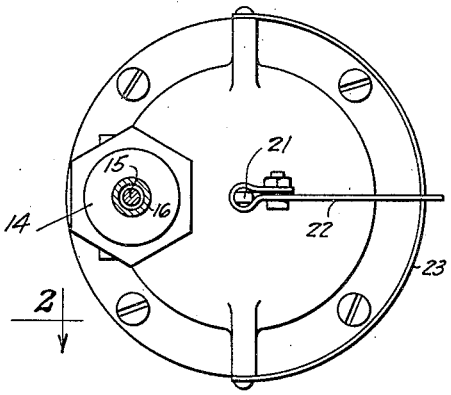
Figure 3:
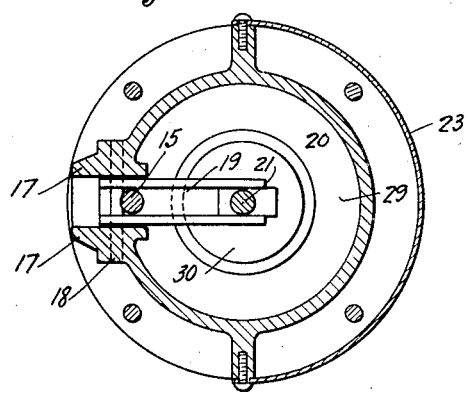

These objects together with other objects and corresponding accomplishments are obtained by means of the embodiment of my invention illustrated in the accompanying drawing, in which:

Fig. 1 is a vertical section through a complete thermostatic control device, the fuel valve being closed; Fig. 2 is a section as seen on the line 2—2 of Fig. 1; Fig. 3 is a section as seen on the line 3—3 of Fig. 1; Fig. 4 is an elevation looking in the direction of the arrow 4 in Fig. 1; Fig. 5 is a view similar to Fig. 1 showing the parts with the valve in open position; and Fig. 6 shows the device installed on a heater, a fragment of the latter being shown in section.

Referring more particularly to Fig. 6, a cylinderical tank is indicated by 7. The tank is provided with a vent 8 for the discharge of burnt gases. A burner 9 has disposed above it a heating element 10. The construction just described is one well known in the water heater art. A pilot light 11 is provided for lighting the burner, and the thermostatic control is indicated generally by 12. The invention resides particularly in the thermostatic control which will now be described more in detail.

A body is provided having a plug portion 14 threaded for engagement with corresponding threads in the bottom of the tank 7. The plug is provided with a bore through which slidably extends a rod 15. The plug is counterbored and internally threaded to receive a tube 16 housing the rod 15 and secured to the upper end thereof by a plug 13. The materials of which the tube and rod are formed have different coefficients of expansion. Thus, rod 15 may be of steel or iron and tube 16 of copper so that there is a difference in expansion, the tube having a greater degree of expansion than the rod. Formed on the body adjacent the plug are ears 17, between which extends a pivot pin 18 supporting a lever 19. Lever 19 operates within a chamber 20 formed in the body. The lever is of a third class having the force applied by rod 15 between the fulcrum and the load. The lever is provided with a threaded bore at the far end in which is disposed an adjustable post 21. The post extends through an opening in the cover of the chamber 20 and is secured to an operating handle 22. The latter has a finger disposed to move over a scale 23 having indicia thereon such as the words warm, hot, and scalding, to indicate different degrees of temperature. It is obvious that by swinging the handle 22 to the various points indicated on the scale, the projection of the post 21 from lever 19 will be varied.

A valve casing 24 is secured to the body of the thermostat. This casing has a wall 25 dividing it into two chambers, one being an inlet chamber having an intake opening 26 provided with a thread so that a pipe may be connected thereto. The wall 25 is arranged to have a valve seat 27 surrounding a valve port for communication between the chambers. The other chamber has an outlet opening 28 internally threaded for a pipe. The outlet chamber is closed at the top by a spring diaphragm 29. The diaphram is a cup shaped member having its bottom or disk portion dished and capable of motion in directions substantially perpendicular to the plane of the disk. When the central part is placed in a position just past the neutral point on one side it tends to return to the opposite side, and, if not hindered against movement, will snap over.

Disposed upon the diaphragm is a resilient push disk 30 having a lateral flange 31 in the form of a ring contacting with the diaphragm. At the center of the disk is an indentation 32 to receive the end of post 21. The spring of the diaphragm is such as to normally maintain the position shown in Fig. 1. Pressure thereon due to movement of rod 15 caused by contraction of tube 16 will cause the lever 19 to be swung toward the diaphragm, moving disk 30 and pressing upon the diaphragm at the ring 31. After the diaphragm has moved over its neutral point, it snaps into the position shown in Fig. 5. The diaphragm is so arranged that release of pressure upon the upper side will cause the diaphragm to return, due to its own resiliency. Thus, breaking of parts releasing pressure on the push ring will cause the valve to be closed. The casing 24 is provided with an opening in which a plug 33 is disposed. This plug carries a recess registering with an opening in a guide bridge 34. The recess and opening last described serve to guide a valve stem 35, upon which is secured a valve disk 36 controlling the valve port. A compression spring 37 tends to maintain the valve disk upon its seat. When pressure upon the valve stem is released, compression spring 37 will move the valve 36 upon its seat thereby closing the port and preventing the passage of gas through intake 26 to outlet 28.

The burner 9 is so arranged that when gas is supplied thereto, it will be lighted from the pilot light 11. Assume that the water in the boiler is cold. Under these conditions tube 16 will contract and rod 15 will exert pressure on lever 19. The result will be that rod 15 pushes lever 19 into the position shown in Fig. 5. In this position, the spring diaphragm is buckled so as to hold valve stem 35 with valve 36 off its seat. Gas can flow from the supply pipe through intake 26 and out through outlet 28 to the burner. The burner heats the water within the tank and its temperature rises. Tube 16 expands and lifts rod 15 away from lever 19, thereby releasing pressure upon lever 19 and permitting the spring diaphragm to move upwardly. When the diaphragm reaches its neutral point, a portion thereof within the ring 31 will snap upwardly permitting the valve disk to entirely close. It is obvious that a limited movement of the ring 31 will cause a greater movement at the center of the diaphragm. By adjusting the post 21, the point at which the diaphragm moves to permit closure of the valve can be adjusted. This adjustment is commensurate with the temperature desired. The resilient portion of disk 30 provides a yielding connection between post 21 and the diaphragm thereby providing means to take up the increased movement of the post 21 when the burner is shut off and the water in the tank becomes cold.

What I claim is:

1. A thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, a lever for transmitting motion from said thermally expansible member to said push member, a post mounted on said lever by threads and engaging said push member at the center thereof, an adjustment handle on said post having a finger operating over a scale temperature indicia thereon, said post being arranged to move said push member whereby to push said diaphragm over its neutral point, a valve casing having intake and outlet chambers side by side and separated by a partition wall having a valve port, said diaphragm closing one side of said casing, a valve disk for said port having a stem disposed to be engaged and moved by said diaphragm and means tending to maintain said valve closed.

2. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, a lever for transmitting motion from said thermally expansible member to said push member, a post adjustably mounted on said lever and engaging said push member at the center thereof, whereby to adjust the projection of said post, said post being arranged to move said push member whereby to push said diaphragm over its neutral point, a valve casing having intake and outlet chambers side by side and separated by a partition wall having a valve port, said diaphragm closing one side of said casing, a valve disk for said port having a stem disposed to be engaged and moved by said diaphragm, and means tending to maintain said valve closed.

3. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, a lever for transmitting motion from said thermally expansible member to said push member, a post threaded to said lever and engaging said push member at the center thereof, an adjustment handle on said post having a finger operating over a scale having temperature indicia thereon, said post being arranged to move said push member whereby to push said diaphragm over its neutral point, a valve casing having intake and outlet chambers separated by a partition wall having a valve port, a valve disk for said port having a stem disposed to be engaged and moved by said diaphragm, and means tending to maintain said valve closed.

4. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, a lever for transmitting motion from said thermally expansible member to said push member, a post adjustably mounted on said lever and engaging said push member at the center thereof, said post being arranged to move said push member whereby to push said diaphragm over its neutral point, a valve casing having intake and outlet chambers separated by a partition wall having a valve port, a valve disk for said port having a stem disposed to be engaged and moved by said diaphragm, and means tending to maintain said valve closed.

5. In a thermostat control, the combination of a thermally expansible member, a dished spring diaphragm tending to maintain itself on one side of its neutral point and arranged to be moved past its neutral point to the other side, a push member engaged with said diaphragm at points bridging the center thereof, a lever for transmitting motion from said thermally expansible member to said push member, a post threaded to said lever and engaging said push member intermediate said points, an adjustment handle on said post having a finger operating over a scale having temperature indicia thereon, said post being arranged to move said push member whereby to push said diaphragm over its neutral point, a valve casing having intake and outlet chambers side by side and separated by a partition wall having a valve port, said diaphragm closing one side of said casing, a valve disk for said port having a stem disposed to be engaged and moved by said diaphragm, and means tending to maintain said valve closed.

6. In a thermostat control, the combination of a thermally expansible member, a dished spring diaphragm tending to maintain itself on one side of its neutral point and arranged to be moved past its neutral point to the other side, a push member engaged with said diaphragm at points bridging the center thereof, a lever for transmitting motion from said thermally expansible member to said push member, a post adjustably mounted on said lever and engaging said push member intermediate said points, said post being arranged to move said push member whereby to push said diaphragm over its neutral point, a valve casing having intake and outlet chambers side by side and separated by a partition wall having a valve port, said diaphragm closing one side of said casing, a valve disk for said port having a stem disposed to be engaged and moved by said diaphragm, and means tending to maintain said valve closed.

7. In a thermostat control, the combination of a thermally expansible member, a dished spring diaphragm tending to maintain itself on one side of its neutral point and arranged to be moved past its neutral point to the other side, a push member engaged with said diaphragm at points bridging the center thereof, a lever for transmitting motion from said thermally expansible member to said push member, a post threaded to said lever and engaging said push member intermediate said points, an adjustment handle on said post having a finger operating over a scale having temperature indicia thereon, said post being arranged to move said push member whereby to push said diaphragm over its neutral point, a valve casing having intake and outlet chambers separated by a partition wall having a valve port, a valve disk for said port having a stem disposed to be engaged and moved by said diaphragm, and means tending to maintain said valve closed.

8. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, a lever for transmitting motion from said thermally expansible member to said push member, a post threaded to said lever and engaging said push member at the center thereof, an adjustment handle on said post having a finger operating over a scale having temperature indicia thereon, said post being arranged to move said push member whereby to push said diaphragm over its neutral point, and a valve having a stem engaged by said diaphragm whereby to be opened and closed thereby.

9. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, a lever for transmitting motion from said thermally expansible member to said push member, a post adjustably mounted on said lever and engaging said push member, said post being arranged to move said push member whereby to push said diaphragm over its neutral point, and a valve having a stem engaged by said diaphragm whereby to be opened and closed thereby.

10. In a thermostat control, the combination of a thermally expansible member, a dished spring diaphragm tending to maintain itself on one side of its neutral point and arranged to be moved past its neutral point to the other side, a push member engaged with said diaphragm at points bridging the center thereof, a lever for transmitting motion from said thermally expansible member to said push member, a post threaded to said lever and engaging said push member intermediate said points, an adjustment handle on said post having a finger operating over a scale having temperature indicia thereon, said post being arranged to move said push member whereby to push said diaphragm over its neutral point, and a valve having a stem engaged by said diaphragm whereby to be opened and closed thereby.

11. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, means transmitting motion from said thermally expansible member to said push member at its center whereby to push said diaphragm over its neutral point, a valve casing having intake and outlet chambers side by side separated by a partition wall having a valve port, said diaphragm closing one side of said casing, a valve disk for said port having a stem disposed to be engaged and moved by said diaphragm, and means tending to maintain said valve closed.

12. In a thermostat control, the combination of a thermally expansible member, a dished spring diaphragm tending to maintain itself on one side of its neutral point and arranged to be moved past its neutral point to the other side, a push member engaged with said diaphragm at points bridging the center thereof, means transmitting motion from said thermally expansible member to said push member intermediate said points whereby to push said diaphragm over its neutral point, a valve casing having intake and outlet chambers side by side separated by a partition wall having a valve port, said diaphragm closing one side of said casing, a valve disk for said port having a stem disposed to be engaged and moved by said diaphragm, and means tending to maintain said valve closed.

13. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, means transmitting motion from said thermally expansible member to said push member at its center, whereby to push said diaphragm over its neutral point, a valve casing having inlet and outlet chambers separated by a partition wall having a valve port, a valve disk for said port having a stem disposed to be engaged and moved by said diaphragm, and means tending to maintain said valve closed.

14. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, means transmitting motion from said thermally expansible member to said push member at its center, whereby to push said diaphragm over its neutral point, and a valve having a stem engaged by said diaphragm whereby to be opened and closed thereby.

15. In a thermostat control, the combination of a thermally expansible member, a dished spring diaphragm tending to maintain itself on one side of its neutral point and arranged to be moved past its neutral point to the other side, a lever for transmitting motion from said thermally exanpsible member to said push member, a post threaded to said lever and arranged to transmit motion to said diaphragm, an adjustment handle on said post having a finger operating over a scale having temperature indicia thereon, and a valve having a stem engaged by said diaphragm whereby to be be opened and closed thereby.

16. In a thermostat control, the combination of a thermally expansible member, a dished spring diaphragm tending to maintain itself on one side of its neutral point and arranged to be moved past its neutral point to the other side, a push member comprising a resilient disk engaged at its outer rim with said diaphragm, and means transmitting motion from said thermally expansible member to said push member.

17. In a thermostat control, the combination of a thermally expansible member, a dished spring diaphragm tending to maintain itself on one side of its neutral point and arranged to be moved past its neutral point to the other side, a push member engaged with said diaphragm at points bridging the center thereof, and means transmitting motion from said thermally expansible member to said push member intermediate said points.

18. In a thermostat control, the combination of a thermally expansible member, a dished spring diaphragm arranged to be moved past its neutral point, a push member comprising a resilient disk engaged with said diaphragm on a ring, and means transmitting motion from said thermally expansible member to said push member at its center whereby to push said diaphragm over its neutral point.

19. In a thermostat control, the combination of a thermally expansible member, a dished spring diaphragm arranged to be moved past its neutral point, a push member engaged with said diaphragm at points bridging the center thereof, means transmitting motion from said thermally expansible member to said push member intermediate said points whereby to push said diaphragm over its neutral point.

In witness that I claim the foregoing I have hereunto subscribed my name this 4th day of March, 1924.

WILLIAM ALFORD MERRICK.